Oct. 17, 1967  R. A. MARVIN  3,346,969
HELICOPTER GROUND RESONANCE SIMULATOR
Filed June 1, 1965  2 Sheets-Sheet 2

INVENTOR
RONALD A. MARVIN

BY *Larson and Taylor*

ATTORNEYS

United States Patent Office 3,346,969
Patented Oct. 17, 1967

3,346,969
HELICOPTER GROUND RESONANCE SIMULATOR
Ronald Arthur Marvin, Horsham, England, assignor to Communications Patents Limited
Filed June 1, 1965, Ser. No. 460,391
Claims priority, application Great Britain, July 1, 1964, 27,265/64
4 Claims. (Cl. 35—12)

This invention relates to ground-based aircraft flight simulating apparatus for simulating helicopter flight.

In certain types of helicopters, the rotor blades of the aircraft are not rigidly attached to the driving hub, in order to reduce torsional reaction of the rotor blades upon the hub. A common form of construction is then to attach the rotor blades to the hub by way of a drag hinge. This arrangement permits of limited movement of the rotor blades relative to the hub in the plane of the rotor.

With this construction, however, an extreme vibration, known as ground resonance, can occur under certain ground-borne conditions. Ground-resonance is a self-excited mechanical vibration caused by a coupling between the motion of the blades about the drag hinges and the motion of the aircraft fuselage on its landing gear. When the frequencies of the two effects are close to each other, vibration of such excessive amplitude may occur that, if it be allowed to persist, the aircraft may be completely destroyed.

The frequency of the rotor blade motion about the drag hinges is determined primarily by rotor speed. Therefore, for given conditions of the aircraft, there is a range of rotor r.p.m. within which resonance can be induced.

Ground-resonance is more likely to occur when the fuselage has a low natural frequency of lateral motion, that is when the fuselage inertia, or gross weight, is high, or when the tires are soft. In addition, certain lateral disturbances may increase the resonance effect. Such disturbing influences include cross-wind, standing on sloping ground, landing with lateral velocity and landing with a bank angle other than zero. With some helicopters, high ambient temperature also may increase the tendency to resonance.

Helicopter pilots are taught to avoid remaining within the critical range of rotor speeds, so far as is possible, when in ground-borne conditions. If resonance starts, the corrective action is to increase engine power immediately, so as to become airborne or, alternatively, to apply the rotor brake immediately, in order to reduce the rotor speed below the critical range.

In a ground-based simulator for simulating helicopter flight, it is obviously desirable, therefore, to include simulation of the ground resonance effect, so that a pilot is trained to avoid the onset of ground resonance in actuality and to take promptly the correct action if the condition occurs.

It is an object of the present invention, therefore, to provide improved apparatus for simulating helicopter flight in which the ground resonance effect may be simulated.

It is a further object of the present invention to provide apparatus for simulating ground resonance effect in which the expense of computing the full equations of motion of the helicopter about the oleo undercarriage is avoided.

Accordingly, the present invention provides ground-based aircraft flight simulating apparatus for simulating helicopter flight, including means for generating a first signal which is a function of aircraft rotor speed and which has a peak amplitude that is a maximum or a minimum amplitude, within a simulated critical range of rotor r.p.m., means for generating at least one second signal which is a function of a quantity known to affect ground resonance, summing means for adding said first and second signals to provide a summing signal of one polarity, means for establishing a threshold signal of the opposite polarity, signal comparison means for comparing said summing signal with said threshold signal to produce a control signal, normally de-activated means including an oscillator for simulating to a user's perception the physical and visual effects of ground resonance, and means operable only when said control signal is of the opposite sense than said threshold signal for activating said oscillator means.

Preferably, said further signals include signals which are a function of the following simulated quantities:

(i) aircraft weight;
(ii) cross-wind speed;
(iii) aircraft lateral velocity;
(iv) bank angle;
(v) ambient temperature.

The value of aircraft weight may be set in by a preset manual control or be derived from the flight computer of the flight simulator. The value of cross-wind speed is derived according to pre-set inputs of wind speed and direction with respect to the flight simulator and resolved according to aircraft heading. The values of lateral velocity, bank angle and ambient temperature are signals all available from the flight computer of the flight simulator.

The threshold signal has a constant value during operation of the apparatus and may be pre-set to the required amplitude by a manual control. Conveniently, the control has a calibrated scale showing upper and lower amplitude limits, the one such that resonance never occurs, the other such that resonance always occurs at some stage of take-off and landing.

The threshold signal may conveniently be of opposite sign to said first signal, so that summing of said first and further signals and comparison with the threshold signal may be performed by a summing amplifier having means included in the output thereof for detecting when the summed output signal is opposite in sign to the threshold signal.

Conveniently, a "hold" input signal is initiated once the resonance condition is simulated, so that a trainee pilot is required to bring about a significant change of aircraft conditions before the resonance condition is remedied. Such "hold" signal may be added to said first and further signal inputs to the said summing means.

In order that the invention may be clearly understood, a practical embodiment will now be described in detail, by way of example, with reference to the accompanying drawings, of which:

FIG. 1 and FIG. 3 show the apparatus forming a preferred embodiment of the invention which is a part of, and derives certain of its inputs from, the flight computer 101 of a flight simulator for simulating the flight of a helicopter.

Figure 1:
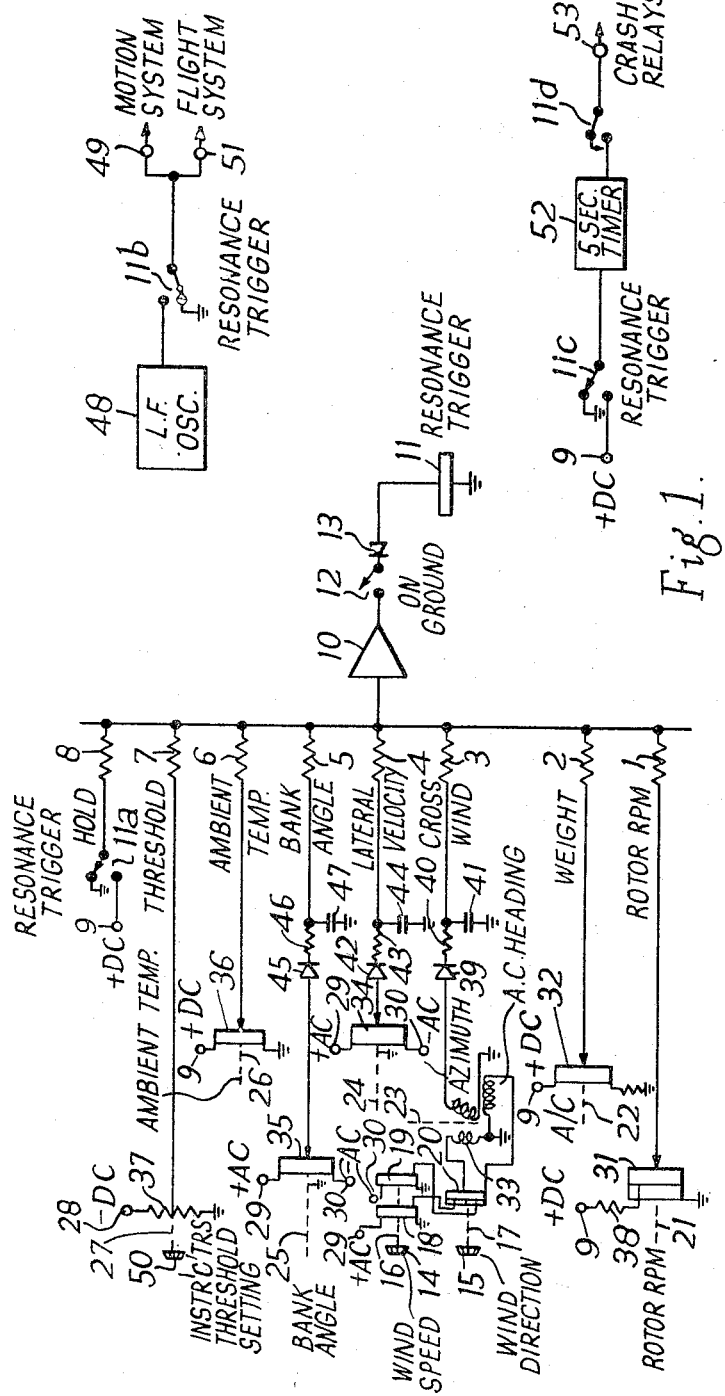
FIG. 1 is a schematic diagram of a preferred form of the present invention.

The apparatus of FIG. 1 comprises a DC summing amplifier 10 having a stabilizing negative feedback, not shown in the drawing, and eight input lines to summing resistors 1 to 8, respectively.

A first input signal, to summing resistor 1, is a signal which is a function of aircraft rotor speed and which has a maximum amplitude within a simulated critical range of rotor r.p.m.

Further input signals, to summing resistors 2 to 6 respectively, are signals which correspond to, or are a predetermined function of, aircraft weight, cross-wind speed, aircraft lateral velocity, aircraft bank angle and ambient temperature.

A threshold signal, of preset amplitude, but of constant amplitude during a single operation of the apparatus, is applied to summing resistor 7.

A "hold" signal is applied to summing resistor 8 only during simulated occurrence of ground resonance.

The summing amplifier 10 has its output connected to one terminal of a resonance trigger relay 11 by way of an "on ground" switch 12 and a rectifier 13.

Resonance trigger relay 11 has its other terminal connected to ground and is energized by the output current of summing amplifier 10 passing through its winding. Relay 11 controls four single-pole two-way switches 11a, 11b, 11c and 11d which, in the de-energized state of relay 11, all have their moving contacts connected to ground as shown in FIG. 1.

"On ground" switch 12 includes a pair of contacts controlled by the "on ground" relay of the flight computer of the simulator. It will be understood from the earlier discussion that ground resonance occurs only when the aircraft is on the ground. Switch 12 is closed only during "on ground" conditions and is opened as soon as the aircraft is airborne.

The threshold signal to summing resistor 7 is of opposite sign from the rotor r.p.m. signal to summing resistor 1, as is explained more fully below. Rectifier 13 is sensed so that it does not pass a summed output signal of the sense of the threshold signal but passes a summed output signal of the opposite sense thereto, that is, of the same sense as the rotor r.p.m. signal.

Considering now the generation of the individual signals present at the input to summing amplifier 10, it will be understood that the quantities which these signals represent, or of which they are a function, are either quantities which are entered into the flight computer 101 as input signals or quantities which are computed by the flight computer from other inputs thereto.

Except in respect of those features now to be explained, the form of the flight computer 101 is immaterial. Suitable forms are well-known and therefore need not be described in detail herein.

The flight simulator has a "wind-speed" input control 14 and a "wind-direction" input control 15 coupled to driving shafts 16 and 17, respectively. Both controls 14 and 15 are provided on an Instructor's Console and are preset by the instructor prior to a simulated flight.

Shaft 16 drives the wipers of two potentiometers 18 and 19, deriving inputs respectively from a +AC source at terminals 29 and a −AC source at terminal 30. The other ends of the potentiometer elements are connected to ground. The two outputs from potentiometers 18 and 19 are fed to the input of a sine-cosine potentiometer driven by shaft 17. Potentiometers 18, 19 and 20 together provide North and East components of the wind from the preset wind speed and direction controls 14 and 15. These North and East wind components are further resolved in respect of aircraft heading by being supplied to the quadrature coils of a resolver 33, which is controlled according to aircraft heading in the manner described below.

From other preset inputs provided in the Instructor's Console 102 and from inputs derived from the controls 103 and 104 in the flight deck 100 operated by a trainee pilot during a simulated flight, the flight computer 101 computes a number of quantities which are available within the flight computer in the form of mechanical outputs represented by the rotational setting of the output shafts of a number of servos.

Thus, servo output shafts 21 to 26 are rotated to represent the following magnitudes:

21—rotor speed in r.p.m.
22—aircraft weight
23—aircraft azimuth
24—aircraft lateral velocity
25—bank angle
26—ambient temperature.

Shaft 21 drives the wiper of a potentiometer 31 having a contoured element deriving an input from a +DC source at terminal 9 by way of series resistor 38.

The potentiometer 31 has a contoured element having its two ends earthed and the +DC input connected to an intermediate tap. The potentiometer output, supplied as rotor r.p.m. signal to summing resistor 1, is related to rotor r.p.m., as represented by the angular rotation of shaft 21, according to the relationship shown in FIG. 2.

Figure 2:
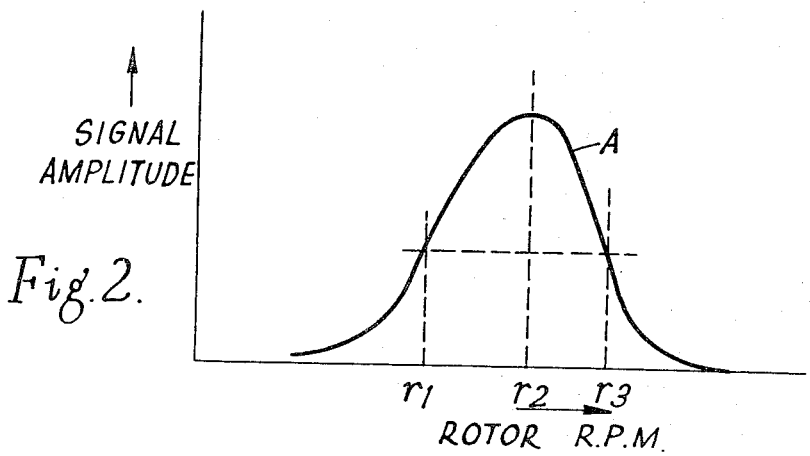
FIG. 2 is a graph showing the relationship between the rotor r.p.m. signal, fed to the summing resistor 1 of FIG. 1, and simulated rotor speed.
Figure 3:
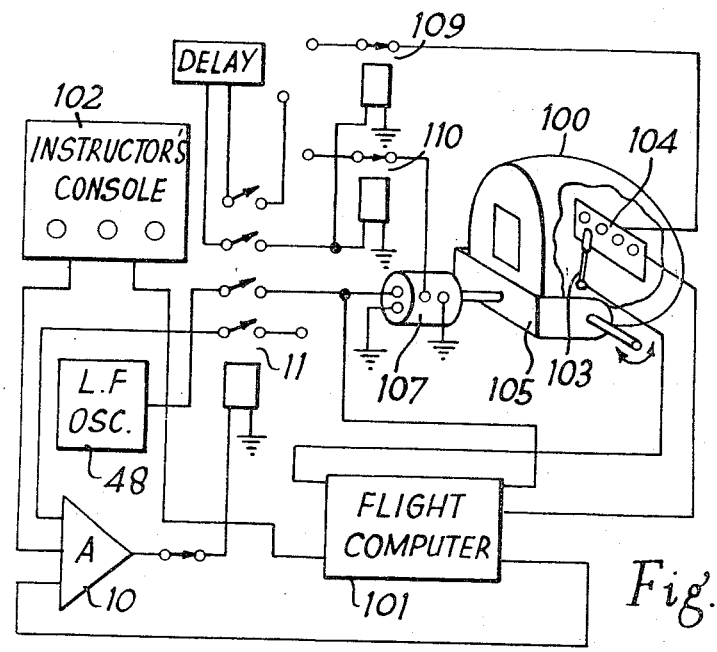
FIG. 3 is a schematic diagram showing the total combination of elements of a helicopter ground resonance simulator including apparatus according to the invention.

In the graph of FIG. 2, rotor speed in r.p.m. increases to the right along the horizontal axis and signal amplitude increases upwards along the vertical axis. The curve A, showing the signal output, increases to a maximum at a rotor speed $r_2$ and decreases for rotor speeds above and below speed $r_2$. The curve A has ½ maximum amplitude at lower and higher speeds $r_1$ and $r_3$, respectively, and the range $r_1$ to $r_3$ may, in this particular example, be regarded as the critical range of rotor speeds for the ground resonance effect.

Shaft 22, driven from the gross weight servo, drives the wiper of a potentiometer 32 having its element connected at one end to the +DC source at terminal 9 and at the other end to ground. The output voltage is applied as the aircraft weight signal to summing resistor 2.

Shaft 23, connected to the aircraft azimuth servo, drives the rotor of resolver 33, so that wind velocity is resolved according to aircraft heading to derive a cross-wind signal. The resultant AC signal is phased according to direction, that is right to left or left to right with respect to the aircraft. However, such direction has no significance, only the cross-wind speed. Accordingly, the AC signal is rectified by a rectifier 39 and smoothed by resistance-capacitance filter 40, 41 to provide the unsensed DC resultant signal. This cross-wind signal is fed to summing resistor 3.

Shaft 24, driven from the lateral velocity servo, drives the wiper of a potentiometer 34. The potentiometer 34 has an element with opposite ends connected to +AC and −AC sources at terminals 29 and 30, respectively, and a centre tap connected to ground. The output provides an AC signal of magnitude varying according to velocity and phased according to the sense of aircraft motion. Only the velocity modulus is significant, not the sense. Accordingly, the AC signal is rectified by a rectifier 42 and smoothed by resistance-capacitance filter 43, 44 to provide the unsensed DC resultant signal. This lateral velocity signal is fed to summing resistor 4.

Shaft 25, driven from the roll angle servo, drives the wiper of a potentiometer 35 having an element with opposite ends connected to +AC and −AC sources at terminals 29 and 30, respectively, and a centre tap connected to ground. The output signal varies in magnitude according to bank angle and is phased according to the sense of banking. The sense of banking is not significant, only the bank angle. Accordingly the AC signal is rectified by a rectifier 45 and smoothed by a resistance-capacitance filter 46, 47 to provide the resultant unsensed DC signal. This bank-angle signal is fed to summing resistor 5.

Shaft 26, driven from the temperature servo of the atmosphere computing system of the flight simulator, drives the wiper of a potentiometer 36 having an element connected at one end to the +DC source at terminal 9 and connected at the other end to ground. The DC output ambient temperature signal is fed to summing resistor 6.

A manually set control 50 is provided on the Instructor's Console 102 for setting in the ground-resonance threshold signal in readiness for a simulated flight. Control 50 rotates a shaft 27 which drives the wiper of a potentiometer 37 having an element with one end connected to a −DC source at terminal 28 and the other end connected to ground. The DC output signal is fed to summing resistor 7.

The maximum amplitude is determined, in relation to the magnitudes of the other input signals to summing resistors 1 to 6, which other signals are of opposite sense to the threshold signal that, when the threshold signal has its maximum value, onset of resonance is never reached and, when the threshold signal has its minimum value, resonance occurs on every take-off and landing.

When the aircraft is "on ground" and when the sum of inputs to resistors 1 to 7 exceeds zero and in the pass sense of rectifier 13, relay 11 is operated to close switch contacts 11a, 11b, 11c and 11d, all shown in the grounded position in FIG. 1.

Closure of contacts 11a has the effect of applying a "hold" signal, derived from the +DC source at terminal 9, to summing resistor 8. This signal is of opposite sense to the threshold signal to resistor 7 and, in effect, lowers the threshold of resonance. Since the "hold" signal is applied only after the onset of resonance, the sum of signals to resistors 1 to 6 must be significantly changed to escape from the ground resonance condition. In simulated take-off or landing, this requires, in fact, significant change of the rotor r.p.m. signal to resistor 1.

Closure of contacts 11b connects the output of a low frequency oscillator 48 to motion system and flight system input terminals 49 and 51, respectively.

The output of oscillator 48 is an electric wave of frequency between 0.5 c.p.s. and 2.0 c.p.s. This signal is fed to the roll axis control motor 107 connected to the electro-mechanical system 105 from terminal 49 and to the flight system instruments from terminal 51, whereby the physical and the visual effects, respectively, of ground resonance are simulated to the trainee pilot's perception.

As previously stated, the required response on the part of the trainee pilot is immediate change of rotor r.p.m., to take the rotor speed out of the critical range, by increasing engine power for take-off or by applying the rotor brake. The appropriate controls, not shown in FIG. 1, are provided among the pilot-operated controls of the flight simulator. Their operation is reflected in rotor speed, as shown by the setting of rotor speed servo output shaft 21 and hence the input signal to resistor 1.

As stated, if the resonance condition is not quickly escaped from, the aircraft may be destroyed.

Accordingly, closure of contacts 11c connects the +DC source at terminal 9 to the input of an interval timer 52. After an interval of 5 seconds, the +DC input appears at the interval timer output. Contacts 11d are also closed, so that the output signal is applied to terminal 53 to operate the crash relays 109 and 110 of the flight simulator.

What I claim is:

1. Helicopter flight simulating apparatus, comprising means generating a first direct-current signal voltage as a function of simulated aircraft rotor speed, said signal having a peak amplitude between maximum and minimum amplitudes within a simulated critical range of rotor revolutions per minute;

means generating a second signal voltage as a function of a simulated factor affecting ground resonance;

a source of direct-current threshold voltage the polarity of which is opposite that of said first signal voltage;

summing means for adding said first, second and threshold voltages to produce a resultant control voltage;

normally de-activated motion and flight system means including a low frequency oscillator and mechanical vibration means for simulating to a user's perception the physical and visual effects, respectively, of ground resonance; and means operable only when said control voltage has the same polarity as said first signal voltage for activating said motion and flight simulating system means, said system activating means including in series connection a uni-directional conductive device.

2. Apparatus as defined in claim 1, and further including means operable simultaneously with the activation of said motion and flight system means for adding to said first, second and threshold voltages a direct-current "hold" signal voltage the polarity of which is the same as said first signal voltage, whereby significant decrease of one of said first and second signals relative to said threshold signal voltage is necessary to deactivate said motion and flight system simulating means.

3. Apparatus as defined in claim 2, and further including normally-deactivated simulated crash relay means, and means for activating said simulated crash relay means a given time interval after the activation of said simulating system means.

4. Apparatus as defined in claim 3, wherein said systems activating means comprises in series circuit with said uni-directional conductive device a direct-current summing amplifier, an "on ground" switch, and resonance trigger relay means.

References Cited
UNITED STATES PATENTS

| | | | |
|---|---|---|---|
| 2,824,388 | 2/1958 | Stern et al. | 35—12 |
| 3,001,299 | 9/1961 | Packer et al. | 35—12 |
| 3,078,595 | 2/1963 | Dawson et al. | 35—12 |

EUGENE R. CAPOZIO, *Primary Examiner.*

R. W. WEIG, *Assistant Examiner.*